Oct. 15, 1968

G. M. ZIVER 3,406,279

COOKING SURFACES

Filed Nov. 12, 1965

INVENTOR.
Garo M. Ziver
BY Charles W. Gregg
Agent

United States Patent Office 3,406,279
Patented Oct. 15, 1968

3,406,279
COOKING SURFACES
Garo M. Ziver, Corning, N.Y., assignor to Corning Glass Works, Corning, N.Y., a corporation of New York
Filed Nov. 12, 1965, Ser. No. 507,380
6 Claims. (Cl. 219—464)

ABSTRACT OF THE DISCLOSURE

Panels of a glass-ceramic material which are to have electric heating elements secured adjacent selected symmetrical areas of one surface thereof to provide top-of-stove "burners" for kitchen ranges, for example, are provided with minutely convexly curved areas on the opposite panel surface, each such area corresponding with one of said symmetrical areas on said one surface. Each said curved area is formed in a panel by selectively providing compressive stresses in the surface layer thereof which exceed compressive stresses provided in the surface layer of the associated symmetrical area of the opposite surface of the panel.

Figure 1:

The present invention relates to cooking surfaces and, more particularly, to glass-ceramic panels, one of the surfaces of which is to be used for cooking purposes. Still more specifically the invention relates to glass-ceramic panels which have selected areas on one of their surfaces which are to provide heat for cookery, such panels being especially suitable, for example, for providing top-of-stove "burners" for kitchen ranges.

Conventional heating elements and burners employed on electric and gas hotplates, and the top-of-stove cooking units of electric and gas kitchen stoves or ranges, are relatively difficult to clean or to maintain in such condition. Furthermore, such conventional heating elements or burners are not especially attractive, that is, do not present an especially pleasing aspect, but often an unfavorable or adverse appearance. Accordingly, it has long been sought to provide cooking surfaces which are easily cleaned, are resistant to staining and discoloration, which have a pleasing or ornamental appearance, and which are especially suitable for use on kitchen stoves or ranges for top-of-stove cooking functions, such as the frying of foods, and the boiling of water and other liquids, for example. A material which was suitable for providing all of said desired characteristics for such surfaces was not found until the relatively recent advent of low expansion glass-ceramics such as are disclosed, for example, in Letters Patent of the United States 3,157,522, issued Nov. 17, 1964, to Stanley D. Stookey. However, although the low expansion glass-ceramics such as disclosed in such patent have a high impact strength, that is, are highly resistant to breakage as a result of mechanical shock, it was felt that cooking surfaces made of glass-ceramics and used, for example, on kitchen stoves or ranges for said top-of-stove cooking functions, should have an even greater impact strength or resistance to breakage due to mechanical shock since, in said use, such cooking surfaces would be exposed to more numerous and greater blows than those to which the glass-ceramics were normally subjected. Accordingly, basic panels made of said glass-ceramics and to be used to provide the desired cooking surfaces are strengthened, in a manner hereinafter discussed, to provide additional mechanical or impact strength for the purpose stated.

In the fabrication of cooking units from glass-ceramic panels, electric heating elements which are sinuously wound from a suitable electric resistance wire or ribbon and which have an overall substantially symmetrical configuration are provided adjacent one or more selected symmetrical areas of one surface of a glass-ceramic panel, corresponding symmetrical areas of the opposite surface of the panel forming the "burners" or the "burner areas" of such opposite surface on which cooking functions are to be performed. Said one surface is hereinafter oftentimes referred to as the bottom surface of said panel, and said opposite surface is hereinafter referred to as the top surface of the panel since the panel is, in use, horizontally disposed so that such opposite surface provides the desired cooking surface.

In order to provide optimum cooking utility, automatic control of said electric heating elements is necessary. Accordingly, a thermostatic device is provided for each "burner" and the temperature sensing element of each such device extends diametrically across the respective selected symmetrical area provided on the bottom surface of said panel and associated with the respective "burner." In order to provide optimum thermal sensing, it has been found that the temperature sensing elements of the thermostatic devices should be in physical contact with the bottom surface of said panel and, accordingly, the aforementioned heater elements are each wound so as to provide two substantially symmetrical halves with a space therebetween for disposal of the sensing element of the respective thermostatic device. Each respective sensing element is then disposed diametrically across its associated symmetrical area on the bottom surface of the panel and against that portion of such bottom surface defined by said area.

Following the above-described fabrication of cooking units from glass-ceramic panels, an additional problem was recognized, suc h problem being that oftentimes cooking functions performed thereon, such as the boiling of water or other liquids, for example, could not be suitably controlled. After an extensive investigation the cause of the problem was determined to be that, although it was thought that a flat cooking surface would provide optimum thermal control, in actuality, when various cooking vessels were placed on such a surface they contact the surface at different points thereon. This was found to be due to irregularities in the bottom surfaces of the cooking vessels, such irregularities existing even when vessels which appeared to have flat bottom surfaces were purposely selected and used. The irregularities in the bottom surfaces of the cooking vessels provided air spaces at different locations between each such bottom surface and the cooking surface on which the respective vessel was used, such air spaces being comparatively small but interposing between said surfaces a degree of thermal insulation sufficient to prevent consistent thermal sensing and, thereby, consistent control of the temperature of the contents of the various vessels. That is to say, while the temperature of the contents of one vessel being used to heat water to boiling, for example, could be suitably sensed and controlled due to selected calibration of the thermostatic device associated with the vessel during such heating process, a second vessel subsequently used on the same cooking surface for the same purpose would contact such cooking surface at points thereon different from the first mentioned vessel and, therefore, the sensing element of said thermostatic device would not sense the temperature of such second vessel and its contents in a manner suitable to or compatible with the aforesaid calibration of the thermostatic device.

In addition to the above problem, the further problem was recognized that the temperature of the bottom surface of the glass-ceramic panel, especially during the heating period of the panel, was higher than the top surface thereof and, therefore, the panel warped or curved upwardly about its perimeter to a slight degree. In a panel having a thickness of approximately 0.1250 inch said curvature was determined to be on the order of 0.0020 to 0.0025 inch over a span of six inches. While such curvature appeared relatively small it was sufficient to provide an objectionable thermally insulating air space between the bottom of a cooking vessel and the top surface of the panel. Furthermore, such air space varied in height according to the diametric dimensions of the bottoms of different size cooking vessels employed since, obviously, variations in such dimensions caused variations in the extent said top surface was spanned by the bottoms of such vessels.

The above mentioned problems having been recognized and their causes determined, a further extensive study was made, as discussed below, to determine the solution to such problems.

It is believed expedient to point out at this point in the description that the terms "burner" or "burner areas," as used hereinafter in relation to the top cooking surfaces of the glass-ceramic panels, are intended to mean those portions of such surfaces upon which vessels are placed for cooking purposes, that is, those portions of such cooking surfaces which correspond to the burners of hotplates and ranges etc. of the usual gas or electric type.

In order to provide for optimum temperature control of vessels of various sizes, shapes and condition used on the top cooking surfaces of the glass-ceramic panels, it was determined that it should be required that a selected point or area on the bottom surface of each such vessel should, insofar as practicable, be physically contacted by a selected point or area of the surface of each burner on which the vessels were used. Only one such point or area on the bottom surfaces of said vessels and of the surfaces of the burners on the top surfaces of the glass-ceramic panels could be found which would meet said requirement. Such point or area is the center of each burner provided on said panels and the center of the bottom surface of each of said vessels. Since the shape, size and condition of said vessels could obviously not be changed or always be controlled, it was necessary, in order to attain the above-mentioned physical contact between the selected points on the burners and the bottom of the vessels, that the top cooking surfaces of the glass-ceramic panels be arranged to provide for such physical contact. It was found expedient, in accomplishing such objective, to provide convexly curved areas in the portions of the top surfaces of said panels defining the burner areas, the apex or vertex of each such curved area corresponding with the center of the burners.

While the above-mentioned convexly curved burner areas could be provided by suitably grinding the top surface of the glass-ceramic panels, such grinding of the panels is a relatively time-consuming and costly process. Furthermore, when two or more burners are to be provided on the top surface of a glass-ceramic panel, the grinding of such surface to provide the desired convexly curved burner areas is a relatively complex operation and, therefore, an even greater time-consuming and costly process than when a single burner is to be provided on said surface. This is especially true when two or more burners are to be in close proximity with each other.

In the light of the foregoing discussion, it is the main object of the present invention to provide, as an article of manufacture, a glass-ceramic panel which is ideally suitable for providing cooking surfaces for top-of-stove cooking functions on a kitchen range.

It is another object of the invention to provide glass-ceramic panels each having a surface which is extremely practicable for use in top-of-stove cookery.

It is a third object of the invention to provide a glass-ceramic panel having a surface which is readily adaptable for cooking purposes, and which is durable, relatively smooth and presents a pleasing aspect to a viewer.

It is another object of the present invention to provide panels of the class described, the top cooking surface of each such panel having one or more areas which are arranged so that burners having satisfactory thermal controls for various cooking functions may be provided in said areas of said surface.

In accomplishing the above objects of the invention, panels of a glass-ceramic material and which are to have electric heating elements secured adjacent selected symmetrical areas of one surface thereof are provided. The panel surface opposite said one surface of each such panel is minutely convexly curved to provide a burner area in each of those portions of such opposite surface which corresponds to one of said selected areas of said one surface, the apex or vertex of each such curved area corresponding with the center of the respectively associated symmetrical area on such one surface.

Other objects and characteristic features of the invention will become apparent as the description proceeds.

Figure 2:
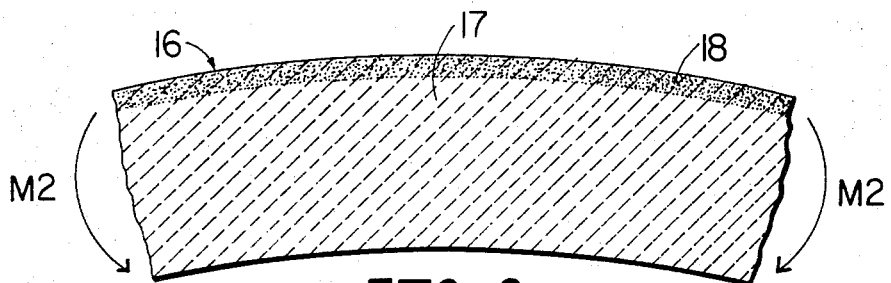
Figure 3:
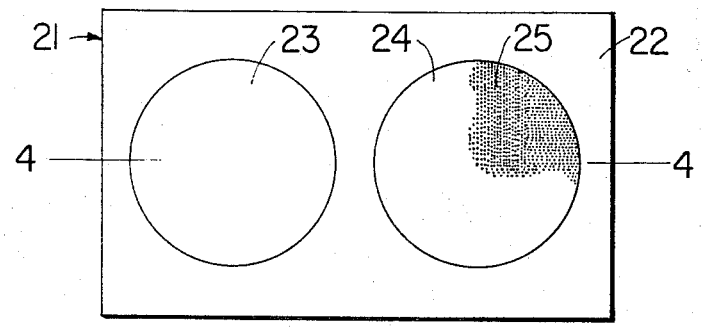
Figure 4:
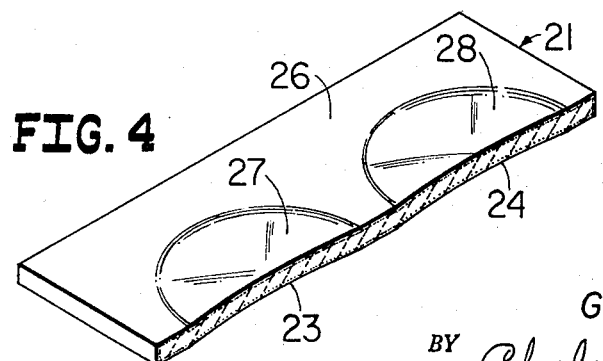

Referring to the drawings in the case, FIG. 1 is a cross-sectional view of a portion of a glass-ceramic panel which is strengthened by developing compressive stresses in the top and bottom surface layers thereof by a process to be discussed;

FIG. 2 is a cross-sectional view similar to FIG. 1 but in which only the top surface layer has compressive stresses therein;

FIG. 3 is a plan view of the bottom of a glass-ceramic panel and illustrates a step in the method of providing curved areas on a surface thereof in accordance with the invention; and FIG. 4 is an isometric top view of the panel of FIG. 3 illustrating a cross-section thereof taken generally along line 4—4 of FIG. 3, such view exaggeratively illustrating the configuration of a finished panel embodying the invention.

Similar reference characters refer to similar parts shown in FIGS. 3 and 4 of the drawings.

The invention will best be understood by reference to the drawings in conjunction with the following discussion of one specific example of a manner of manufacturing a panel embodying the invention.

A basic or parent glass making batch having parts by weight as set forth in Example 4 of Table I given in the aforecited patent to Stookey is prepared and melted as discussed in such patent. The resulting glass, calculated in weight percent on the oxide basis, comprises essentially 70.7% $SiO_2$, 4.8% $TiO_2$, 2.6% $Li_2O$, 18.1% $Al_2O_3$, 1% $ZnO$, and 2.8% $MgO$. The arsenic oxide and impurities being less than 1%, are omitted. Following the melting of the glass as discussed in said patent, the plastic glass or a portion thereof is shaped or formed into a rectangular panel having a thickness on the order of 0.1250 inch and a length and width of the desired dimensions. Such panel may, for example, be approximately 12 inches wide and have a length of approximately 20 inches.

Following the shaping of the panel as discussed above, it is subjected to the heat treatments set forth in Example 14 of Table III given in the said Stookey patent and discussed therein. During such heat treatments the glass of the panel is converted to an opaque semicrystalline ceramic or, as termed in the present application, to an opaque glass-ceramic, thereby producing a basic glass-ceramic panel to be used for providing the cooking surfaces herein discussed. Subsequent to the heat treatments discussed above, the panel is allowed to cool to room temperature.

As previously mentioned, it was considered necessary or, at least, extremely desirable that the mechanical or impact strength of a basic glass-ceramic panel, to be used for provided cooking surfaces as herein discussed, should be substantially increased, that is, increased at least five fold. Accordingly, it was decided to increase the impact strength of the basic glass-ceramic panel, produced as described above, by developing compressive stresses in the surface layers of such panel and to accomplish such objective by chemical alteration in situ of the crystal phase in the surface layers of the glass-ceramic material of which the panel is formed, that is, by exchanging the lithium ion of the beta-spodumene crystal phase for a larger ion within the surface layers of the glass-ceramic panel to develop compressive stresses within such surface layers. When, as heretofore mentioned, it was found expedient to provide convexly curved areas as the burner areas on the top surface of the glass-ceramic panel, investigation was made to determine whether such areas could be provided simultaneously with the strengthening of the panel.

Referring to FIG. 1 of the drawings, there is shown a cross-section of a portion of a glass-ceramic panel 10 having a core 11, and top and bottom surface layers 12 and 13, respectively. Compressive stresses are developed in surface layers 12 and 13 by ion exchange, as previously mentioned and described in more detail hereinafter. When the depths of ion exchange penetration through the surface layers 12 and 13 of panel 10 are equal, the net resultant bending moments M1 are equal as indicated by the double-headed arrows in FIG. 1. When, however, said depths of ion exchange in said surface layers are not equal, a state of static unbalance is created because of unequal compressive stresses in the surface layers and the net resultant bending moments are no longer zero. For example, there is shown in FIG. 2 of the drawings a cross-section of a portion of a glass-ceramic panel 16 having a core 17 and a single surface layer 18 in which compressive stresses are provided as discusseed hereinafter. It is apparent that both the top and bottom surface layers of panel 16 could be strengthened, as illustrated in FIG. 1 and the bottom surface layer subsequently removed, thereby producing the results in the panel such as illustrated in FIG. 2. In any event, the presence of the compressive stresses in surface layer 18 only of panel 16 will exert the bending moment M2, indicated by the single-headed arrows in FIG. 2, thereby causing the panel 16 to bend as illustrated. The amount of bending or deflection of a panel depends, in addition to the mechanical properties of the panel material and its geometry, on the differences between the compressive stresses provided in the top and bottom surface layers of the panel.

There is shown in FIGS. 3 and 4 a glass-ceramic panel 12 produced as previously described with reference to the aforecited Stookey patent. Areas 27 and 28 on the top surface 26 (FIG. 4) of the panel are to be the burner areas of the panel, and areas 23 and 24 on the bottom surface 22 (FIG. 3) of the panel correspond to areas 27 and 28, respectively. The desired convex curvatures of areas 27 and 28 is attained as described below.

As illustrated in FIG. 3, areas 23 and 24 of the bottom surface 22 of panel 21 are partially masked by a pattern of minute dots such as indicated at 25. It will be understood that the entire expanse of each of the areas 23 and 24 are provided with a dotted masking pattern such as indicated at 25 but, for purposes of ease of illustration, such a pattern is shown on a part of area 24 only. The patterns of dots can be applied by various techniques such as, for example, by the use of stencils or by the well known silk-screen process and a specific example of the application of said patterns follows.

An enamel composition comprising 30 parts by weight of calcined alumina and 70 parts by weight of Drakenfield Blue Enamel #27–027, sold by B. F. Drakenfield Inc., Washington, Pa., is mixed with #324 squeegee oil to produce a paste of silk-screen application consistency. Such composition is then applied to areas 23 and 24 of panel 21 through a mesh #306 silk screen having the deisred overall patterns of dots. Such application results in areas 23 and 24 each being masked with a plurality of dots, each of such dots being approximately 0.020 inch in diameter and their being approximately 625 such dots on each square inch of areas 23 and 24. The dotted patterns are then allowed to dry for a period of at least 15 minutes. Following such drying period, panel 21 is placed in a furnace which is heated, for example, at a rate of 5° C. per minute up to a temperature of 800° C. The furnace and the panel are held at the 800° C. temperature for a period of approximately 4 hours. The furnace is then turned off, and the panel and furnace are permitted to cool to room temperature at the inherent cooling rate of the furnace. After cooling, panel 21 is subjected to the previously mentioned strengthening process discussed in detail below.

A bath comprising an eutectic mixture of about 52% KCl and 48% $K_2SO_4$ is operated at a temperature of 750° C. and panel 21 is immersed therein for a period of about 4 hours. After such treatment the panel is removed from the bath and rinsed and dried. By such treatment a portion of the lithium ions in the surface layers on the beta-spodumene glass-ceramic panel are replaced by potassium ions without substantially altering the geometric pattern of the beta-spodumene crystal of the panel. This chemical change in the crystal composition, without corresponding physical change in its geometry, results in the development of compressive stresses in the modified surface layers of panel 21 with consequential increase in the mechanical strength of the panel. Furthermore, such stresses are, due to the previous masking of areas 23 and 24 of surface 22 of panel 21, somewhat less in such areas than they are in the corresponding areas 27 and 28 of the surface 26 of the panel. Such differences in the compressive stresses developed in the surface layers of the associated areas 23 and 27, and 24 and 28, cause such areas, and the region of the core of the panel between the respectively associated areas, to become curved as exaggeratively illustrated in FIG. 4 and similarly to the curvature of panel 16 illustrated in FIG. 2 of the drawings. That is to say, said areas, and the regions of the core of panel 21 therebetween, curve upwardly to provide minutely convexly curved burners on the top surface 26 of panel 21, the apex or vertex of each such burner being directly above the center of the respectively associated areas 23 and 24 on the bottom surface 22 of panel 21. The curvature of each convexly curved area varies between about 0.0032 and 0.0080 inch over a six inch span of the respective area.

It is pointed out that, in practice, an ornamental stain decoration would probably be applied to each of the areas such as 27 and 28 to define the location of the burners to a person performing cooking functions on the top surface 26 of panel 21. However, the provision of such decorations is not an essential part of the invention and, therefore, is not described in detail herein.

Although there is herein shown and described only one specific example of the present invention, it is to be understood that such is not intended to be in any way limiting but that numerous variations and modifications may be made therein within the spirit and scope of the appended claims.

What is claimed is:

1. As an article of manufacture, a panel of glass ceramic material the top surface of which is to be used for cooking purposes, such panel having on its bottom surface at least two adjoining symmetrical areas adjacent each of which an electric heating element is to be provided, the area of said top surface above each such symmetrical area being minutely convexly curved with the apex of each such curved area corresponding with the center of the associated symmetrical area therebeneath, each such curved area being formed by selectively providing compressive stresses in the surface layer thereof which exceed compressive stresses provided in the surface layer of said associated symmetrical area therebeneath.

2. An article of manufacture according to claim 1 and in which said compressive stresses provided in said surface layers are developed therein by a chemical process.

3. An article of manufacture according to claim 2 and in which said chemical process comprises an ion exchange process.

4. As an article of manufacture, a panel of glass-ceramic material the top surface of which is used for cooking purposes, such panel having on its bottom surface at least one symmetrical area adjacent each of which electric heating elements are to be provided, the region of the panel above each such symmetrical area including the top surface layer of such region being minutely convexly curved with the vertex of the surface layer of each respective curved region corresponding with the center of the associated symmetrical area therebeneath, each such curved region being formed by selectively providing compressive stresses in the top surface layer thereof which exceed compressive stresses provided in the surface layer of said associated symmetrical area therebeneath.

5. An article of manufacture in accordance with claim 4 and in which said compressive stresses provided in said surface layers are developed therein by a chemical process.

6. An article of manufacture according to claim 5 and in which said chemical process comprises an ion exchange process.

References Cited

UNITED STATES PATENTS

| | | | |
|---|---|---|---|
| 2,179,934 | 11/1939 | Jones | 219—464 X |
| 2,409,244 | 10/1946 | Bilan | 219—464 X |
| 3,157,522 | 11/1964 | Stookey | 106—52 |
| 3,282,770 | 11/1966 | Stookey et al. | 106—39 |
| 3,287,201 | 11/1966 | Chisholm et al. | 106—39 |
| 3,313,919 | 4/1967 | Richardson et al. | 219—464 |

RICHARD M. WOOD, *Primary Examiner.*

L. H. BENDER, *Assistant Examiner.*